United States Patent [19]
Axelrod et al.

[11] 4,148,579
[45] Apr. 10, 1979

[54] AUTOMATIC MICROFILM CAMERA

[75] Inventors: Donald J. Axelrod, Glenview; John R. Flint, Barrington, both of Ill.

[73] Assignee: Bell & Howell Company, Chicago, Ill.

[21] Appl. No.: 821,279

[22] Filed: Aug. 3, 1977

[51] Int. Cl.² .............. G03B 27/52; B65H 1/04; B65H 5/26; G11B 23/04
[52] U.S. Cl. ...................... 355/41; 355/77; 242/198; 226/76; 226/101; 355/64; 271/9; 355/75
[58] Field of Search ............. 355/64, 65, 50, 51, 355/75, 76, 77, 39–41, 3 R, 18; 242/198, 199, 71.2; 271/4, 35, 9; 226/76, 101

[56] References Cited
U.S. PATENT DOCUMENTS

| | | |
|---|---|---|
| 2,552,220 | 5/1951 | Schubert et al. .................. 355/65 |
| 3,750,553 | 8/1973 | Pfeifer et al. .................... 355/40 X |
| 3,836,250 | 9/1974 | Bookless et al. ................. 355/65 |
| 3,861,799 | 1/1975 | Chiswell et al. ................. 355/64 |
| 3,922,084 | 11/1975 | Burton et al. .................... 355/50 X |
| 3,981,582 | 9/1976 | Bookless ......................... 355/39 X |
| 4,042,298 | 8/1977 | Herrmann ........................ 355/65 X |

Primary Examiner—L. T. Hix
Assistant Examiner—W. J. Brady
Attorney, Agent, or Firm—Alan B. Samlan; Harry G. Thibault

[57] ABSTRACT

An automatic microfilm camera is electronically controlled, as by an electronic logic controller, logic and control unit, or the like, for example. The camera has an automatic feeding stack loader for picking up documents of randomly mixed sizes, photographing them, and then depositing them in an output tray. The automatic feed may be interrupted, so that single documents may be copied. Then, the automatic feed restarts and continues from the point of interrupt. A plurality of sensors respond to documents in order to control both the time of shutter opening and the exposure actuation. Various forms of documents may be processed, including a fan-folded computer readout requiring a pin drive wheel.

29 Claims, 8 Drawing Figures

AUTOMATIC MICROFILM CAMERA

This invention relates to microfilm cameras and more particularly to automatically controlled microfilm cameras, especially—but not exclusively—to cameras controlled by electronic logic controllers or similar devices.

The term "electronic logic controller" is used herein to generically designate any suitable electronic logic and control unit having computer-like control capabilities. Therefore, this term is to be broadly construed to cover all suitable devices.

Microfilm copying is a process wherein photographically reduced images of documents are sequentially formed, usually in successive frames on a reel of film. The microphotographing process involves moving the documents to a copy area, exposing the film, and thereafter removing the documents from the copy area. During this process, it is often necessary for an operator to perform unique functions for any specific documents, which may be presented to the camera in any random order. For example, some documents may have printing on both sides so that it is necessary to photocopy one side and then turn over the document to photocopy the other side. Obviously, the images of these two sides should appear in adjacent frames on the same roll of microfilm. Also, the exposure time may have to be varied at random since documents having different light reflecting intensity are presented at random.

It has been quite difficult to make a completely automatic microfilm camera since it is desirable to automatically feed documents, and to interrupt the automatic feed in order to perform special processing, as the need for such processing occurs. Therefore, on prior "automatic" cameras an operator still had to attend the camera in order to inform it when special processing is required. These are only a few of many examples which could be cited to show how the automatic microfilm camera and its human operator must interact with each other. It is the need for this interaction which has heretofore made a fully automatic microfilm camera difficult to achieve.

Accordingly, an object of the invention is to provide new and improved automatic microfilm cameras. Here an object is to provide a completely automatic camera which performs all normal and additional functions without requiring close human supervision. However, another object is also to provide a human-to-machine interface wherein the machine and its human supervision may work closely together.

Another object is to provide a document transport with an automatic interrupt so that single documents may be hand fed at any preselected points in a filming sequence, without terminating the automatic transport.

Still another object is to provide a convenience microfilm camera with a cassette film load, automatic document feed, document feed interrupt, and the capability of handling a great variety of different kinds of documents (e.g., intermixed documents of different sizes, documents on different kinds of paper, books, punched cards, fan folds, etc.)

Yet another object is to provide microfilm cameras which may record in either of two documents sequences (e.g., an oldest to newest; or newest to oldest; or highest to lowest file numbers; or lowest to highest file numbers order) with readout in only one desired sequence (e.g., oldest to newest). Here an object is to provide a readout capability in a sequence which is opposite to the sequence which the documents were introduced to the camera.

In keeping with an aspect of the invention, these and other objects are accomplished by providing a microfilm camera controlled by an electronic logic controller circuit. An automatic document transport system delivers individual documents from a stack of documents and feeds them, one at a time, through the camera. If the operator wishes to interrupt the documents transport (as when a two-sided copy is required), she inserts a special card into the document stack just ahead of the two-sided document. The operator may also key in any desired file number which is automatically recorded adjacent to a selected image on the microfilm. If desired, documents may be fed into the document transport system in either a chronological or a reverse chronological order. Automatic search "blip" marks are recorded along either of the two edges of the film. If documents are recorded in chronological order, the blip marks are recorded on one edge, and if the documents are recorded in reverse chronological order, the blip marks are recorded on the opposite edge of the film. Hence, the film may be either read out directly as wound on the take-up reel or it may be rewound before read out, in order to present images in the same sequence of order during readout regardless of the order in which they were photocopied.

The terms "chronological" or "reverse chronologial" order are here cited by way of example, only. Actually, the order could also be either alphabetical or numerical, or reversed alphabetical or numerical. Likewise, the documents may be photocopied in any other desired order or an order which is reversed thereto. The point is that the order of photocopying may be reversed for readout purposes.

Other and further objects and features of the invention may become more apparent from a study of the attached drawings, in which.

Figures 1, 2:
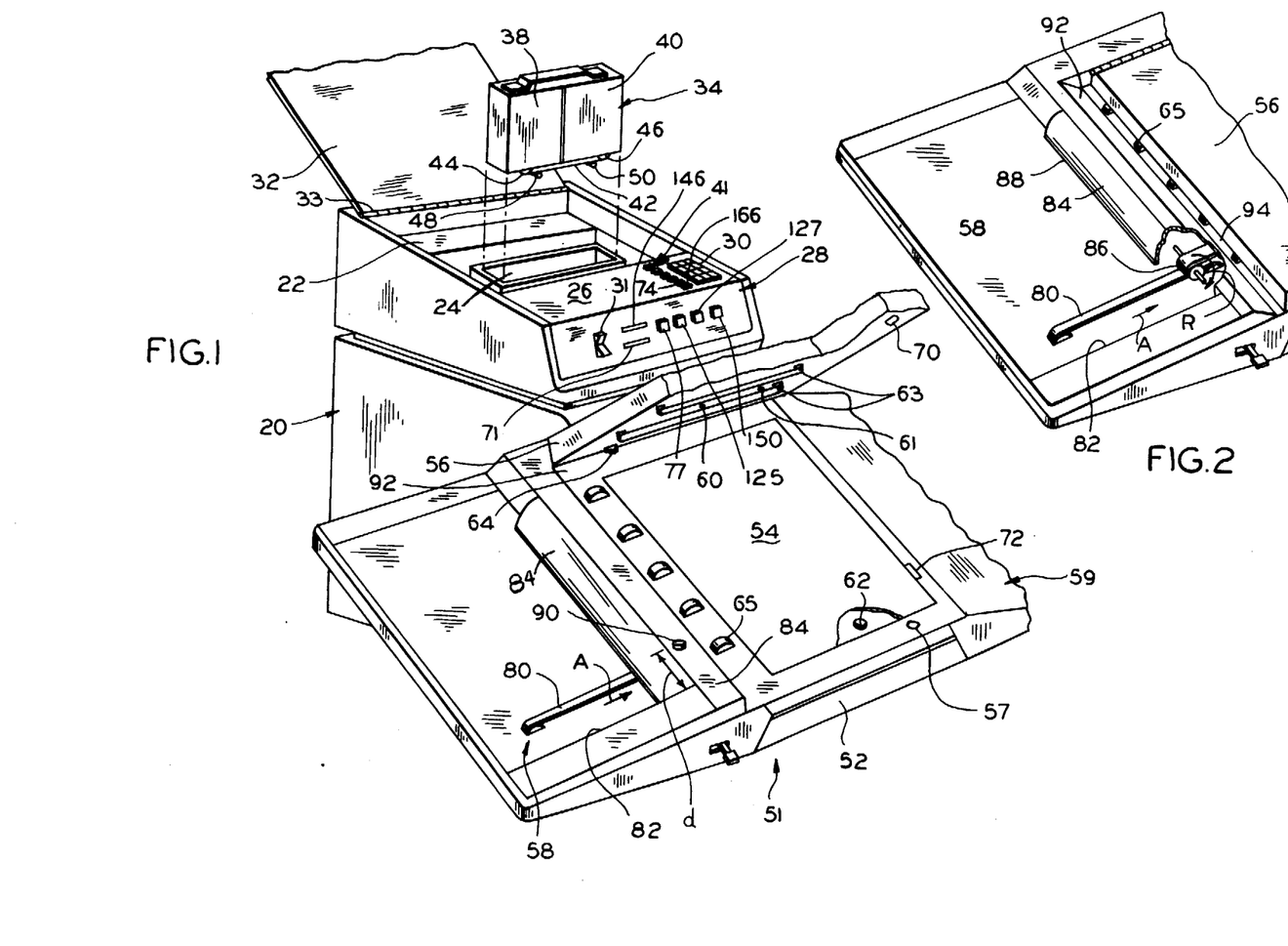
FIG. 1 is a perspective view of the inventive automatic microfilm camera.
FIG. 2 is a perspective view which shows the automatic stack loader document transport and a mechanism for single sheet insert during stack loading interrupt.

The appearance and general features of the inventive camera are best seen in FIG. 1. More particularly, there is a housing 20 containing a camera 22, a cassette receptacle and guide way 24, electronic controls 26, a control panel 28, and a frame identifying signal generating keyboard 30. Toggle switch 31 switches power on and off. A door 32 normally swings down on hinge 33 to cover, conceal and protect the inner workings 22, 24, 26, 30 of the camera. Door 32 is here shown in the open or servicing position.

A cassette 34 has two removable cartridges 38, 40 which contains unexposed film on one side, and exposed film on the other side. The film 42 emerges from one cartridge passes over an exposure traverse and then re-enters the other cartridge. A four-position switch 41 is operated to select any one of up to four film speeds. Of course, provisions may also be made for selecting between any number of film speeds.

After all of the unexposed film has been transported from the supply cartridge 40 to the take-up cartridge 38, the then full take-up cartridge is removed from cassette 34 and the then empty supply cartridge 40 is moved over to the take-up position 38. Next, a new and replacement film supply cartridge may be mounted on cassette 34 at the position presently occupied by cartridge 40. The film 42 is pulled, from that new supply cartridge 40 trained over rollers 46, 44, behind guide posts 48, 50, and threaded onto a reel in the empty cartridge then occupying the cassette position 38. Thereafter, the freshly loaded cassette is dropped into guide 24, properly positioned, and the cover 32 is closed.

On the front of the housing 20 is a copy area or photographic station 51 comprising an inclined shelf 52 having a glass top platen 54 and a hinged cover 56 which may swing up to the position shown in FIG. 1 or down to a document feed position shown in FIG. 2. In the up position, a book or other bulky document may be placed face down on glass platen 54. Push button 57 may be operated to take an individual photographic image of such a book, when the cover 56 is open.

Briefly, the automatic microfilm camera comprises a stack feeder means 58 for receiving and automatically transporting a plurality of documents, one-at-a-time past the copy area or photographic station 51, and to an output tray 59. During this document transport, a pair of photodetectors 60, 61 detect the presence of each transported document as the leading edge of the document interrupts the light reaching the detector. The stack feeder 58 operates responsive to photodetector 60 to transport documents. The camera 22 operates responsive to photodetector 61 to expose microfilm 42 and make thereon a photographic image of the document which is then in the copy area. A third sensor 62 adjusts the exposure time of the camera responsive to the intensity of the light being reflected from the document within the copy area.

In greater detail, when the cover 56 is down, the documents are withdrawn one-at-a-time from the bottom of a stack of documents in tray 58 and transported or slid over the glass platen 54 and under the cover 56. To facilitate such a movement of the documents, the underside of the cover 56 includes a number (here five) of running belts (two of which is numbered 63). These belts are driven by a common shaft (not shown) which is turned by a gear 64 in the cover 56. Thus, when the cover 56 is open, the gear 64 is disengaged from other and driven gears inside the housing 20, and the belts 63 cannot run. When the cover 56 is closed, gear 64 meshes with the driven gear (not shown), and the belt may run, if the driver gear is then running.

Immediately beneath and driven by each of the running belts 63 is a free running idler wheel (one of which is numbered 65). When the cover 56 is closed, the idlers 65 are rotated, if the meshing belts 63 are then running.

On the underside of the cover 56 are the two photo detectors 60, 61 which receive light projected upwardly through the glass platen 54 by lamps (not shown). Thus, the leading edge of each document sequentially cuts the light falling on photodetectors 60, 61. The stack feeder 58 may be automatically operated responsive to photodetector 60 to transport documents in the prescribed manner. Accordingly, the camera 22 may be automatically operated responsive to photodetector 61, in order to photograph on microfilm 42 an image of a document which is then positioned on the glass platen 54.

Means are provided for displaying a number adjacent to each document when it is in the copy area. This number display is manually operated so that any preselected file number may be printed on the microfilm adjacent the photographic document image.

In greater detail, a frame identifying numerical display appears simultaneously at position 70 on the underside of cover 56, for marking the microfilm, and at position 71 on the control panel 28 for informing the operator. These displays may be LED (light emitting diode) displays similar to the displays currently used on small hand-held calculators, for example. Thus, any number which is keyed at 30 is also displayed at 70 and 71. When the cover 56 is closed, the image displayed at 70 appears in a window 72 adjacent to the document copy area, and therefore is photographed along with any document then lying on the glass platen 54. Alternatively, the operator may operate keyboard 30 and the displays at 70, 71 are automatically reset to a suitable starting number such as "0000", for example. Therefore, the operator may supply any desired and suitable file number, which is recorded as a file number adjacent to the document image on the microfilm.

The number displayed may be automatically advanced one digit responsive to every photographed image, or in any other suitable manner so that multiple entries may be made under a single file number.

A stack of documents to be photocopied are placed face down in tray 58, from which they are transported one-at-a-time, passed over the glass platen 54, where they are photographed, and then deposited in the output tray 59. In greater detail, a running belt 80 is positioned near the bottom edge 82 of the tray 58 and driven in a direction A for transporting documents into the nip between the running belts 63 and idlers 65. The belt 80 is positioned a distance d from the ledge 82 on the lower edge of tray 58, which fixes the lower edge of all documents copied in a normal upright position or the top edge of all documents copied in an inverted position. Thus, the distance d is equal to the minimum height of the smallest document which may be transported by the stack loader 58. Smaller documents must be hand-fed onto glass plated 54. All documents having a length or width which is greater than the distance d are transported; therefore, they may have any suitable length or width (up to the height of glass panel 54), and the various lengths may be intermixed indiscriminately.

Inside cover 84 is a driven belt 86 (FIG. 2) which rotates in a direction R, that is opposite to the direction A. The driven belt 86 has a contour which tends to fan the stack of documents and pushes all documents back toward a tray 58, except for the lowermost document which is being carried forward in direction A by the running belt 80. Shield 88 helps guide each document to the interface of belts 86 and 80. A knob 90 (FIG. 1) adjusts the vertical displacement of the driven belt 86 relative to belt 80. Therefore, an interference is created between the driven belt 86 and the running belt 80 which prevents forward motion of all but the bottommost document. Knob 90 may be adjusted, as required, to accommodate documents of different thicknesses and the adjust for wear of parts.

Accordingly, a stack of documents of assorted lengths may be mixed indiscriminately and placed face down in tray 58. The "record" push botton 77 is pushed. Then, belt 80 transports the documents, one-at-a-time, from the bottom and feeds them into the running belts 63 which transport the documents through the photographic station 51, past the copy area 54, and deposit them into the output tray 59.

Means are provided for automatically interrupting the document transport in order to enable feeding of a single document through the document transport mechanism during the period of interrupt. Thereafter, the automatic document transport restarts and continues feeding documents from the point of interrupt.

During the running of a stack of documents, there may be many occasions when it is desirable to so interrupt the automatic feed and to insert a new document. For example, it may be desirable to photocopy the reverse side of a document already in the stack. Therefore, when this document appears, the machine automatically stops in a manner which will become more apparent after a description of FIG. 5 which shows a header card that may be placed between documents on the stack feeder.

For feeding a single document during an interruption of the feeder, the top of cover 84 is built with a sloping surface 92 which guides and directs a document into a slot 94 between cover 84 and cover 56 (when closed). The bottom of slot 94 is immediately in front of the nip between running belts 63 and idlers 65. The angle of surface 92 guides the hand-fed document into the nip.

To copy two sides of a single document in adjacent frames on a microfilm strip, a header card (FIG. 5) is placed in the stack of documents just ahead of the two-sided document. The header card is transported as all documents are transported, but it is not photocopied. It stops the automatic document transport mechanism (i.e., belt 80). The transport belts 63 continue moving in the copy area 54. Thus, the next document in the stack may be turned over, fed into slot 94, and deposited in the grip of the transport belts 63 at a point between the stack loader at tray 58 and the copy area 54. The second side of the hand-fed document is copied as it moves into the copy area 54. Then, the automatic document feed restarts when a shutter closing responsive signal is transmitted to the feed control system.

The trays 58, 59 merely hook into and hang on the photographic station 51 part of housing 20. Therefore, by lifting and slightly tilting the trays, they may be unhooked, removed, and replaced by any other suitable trays (not shown). This way, any of many different kinds of documents may be accommodated. For example, there is a large demand for microfilm copying of a fan-folded readout of a computer. Usually, such a fan fold of paper has a row of sprocket holes along each edge to facilitate the transportation thereof by means of pin drive wheels.

Pin drive wheels means are optionally provided for transporting continuous strip documents with perforations along each edge (such as a fan-folded computer readout) through the microfilm camera. These pin drive wheels may be selectively engaged or disengaged.

In greater detail, to read and photograph a perforated continuous strip or fan fold, the trays 58, 59 are removed. Then, a pair of pin drive wheels 100, 102 (FIG. 3) are released at latches 96, 98 and swung out in direction B. The latches 96, 98 may simply be hand-operated leaf springs which may be pressed out of individual capture slots. Then the pin drive wheels 100, 102 are swung into a position to engage perforations along the edges of the fan fold paper. When the wheels are so raised, the leaf spring latches 96, 98 snap into alternative capture slots 104, 106. One of the pin drive wheels 102 may be manually slid in direction D, E to adjust the wheel spacing to correspond to the width of the fan fold paper.

Figures 3, 4:
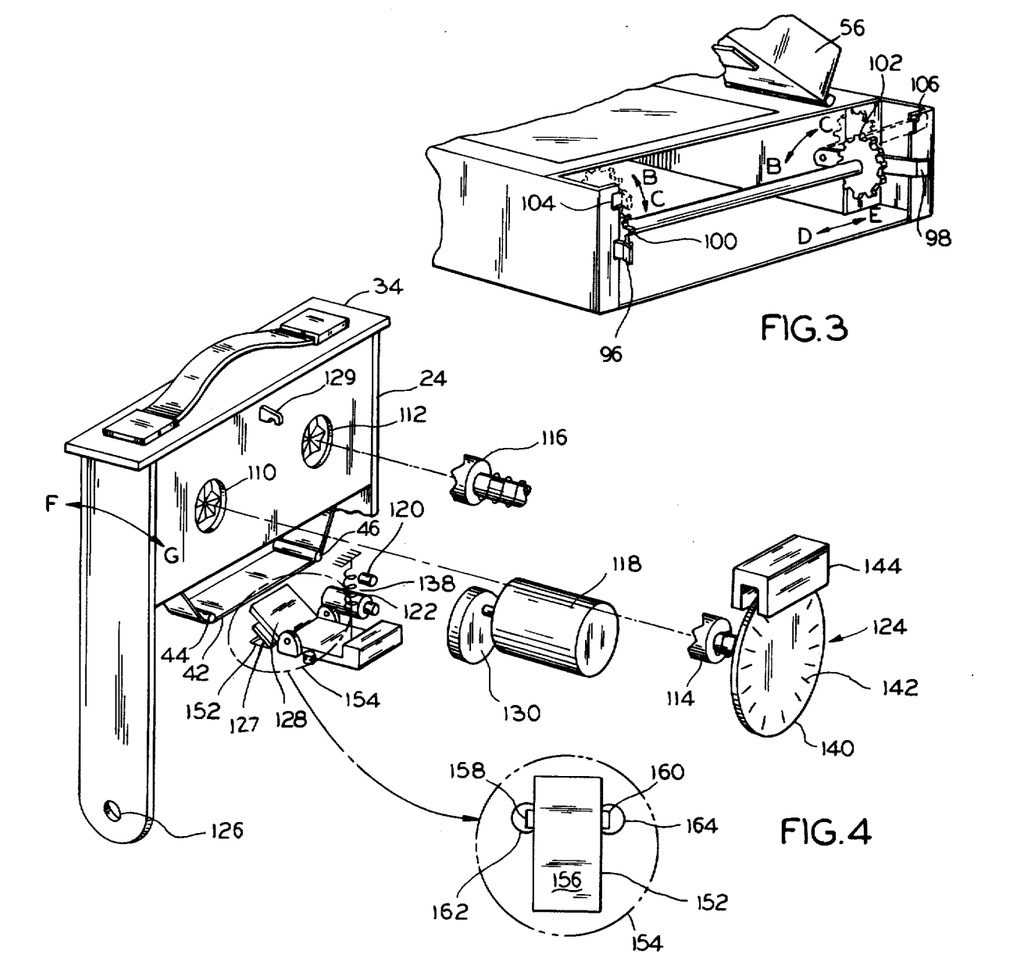
FIG. 3 is a perspective view which shows a pin drive wheel for transporting fan-folded documents through the microfilm camera.
FIG. 4 is an exploded view of selected parts of a film transport mechanism used in the microfilm camera.

After the pin drive wheels are properly extended, suitable trays may be hung on either side of photographic station 51, if desired. Otherwise, the fan fold may simply lie on the floor under the camera. The pin drive wheels 100, 102 transport the fan-folded paper. After all such paper has been photographed, the latches 96, 98 are released, and the pin drive wheels 100, 102 are swung back in direction C to a stowed position. Thereafter, the conventional trays 58, 59 are returned to their normal position.

Means are provided for transporting microfilm through the camera. This film transport means includes a cassette carrying a preloaded supply of film following a path which emerges from and then re-enters the cassette. The associated camera is operated responsive to an insertion of the cassette to engage the emerging film and to drive it past a format area in the camera.

The nature of this film transport mechanism should become more apparent from a study of FIG. 4. The details of the cassette 34 itself are found in the copending commonly asssigned patent application entitled "Web Cassette With Cartridge Load", Ser. No. 793,621 filed on Nov. 4, 1977 by Donald Axelrod. Therefore, it will not be further described at this point in this specification.

The major components in the film transport mechanism are the cassette receptacle and guideway 24, a pair of V-tooth couplings 110, 112, 114, 116, an AC motor 118, a capstan 120 and pressure wheel 122, and a tachometer or a film speed detector 124. Then, push button 127 (FIG. 1) is operated to energize a cassette released solenoid (seen in FIG. 7), which releases a catch 129 on the receptacle and guideway 24. The guideway 24 swings in direction F on a pair of pivot points (one of which is seen at 126) for loading and in direction G for operation of the camera. The supply cartridge 40 containing a reel of unexposed film is associated with V-tooth coupler 110 and the take-up cartridge 38 containing an empty reel is associated with coupler 112. When the cassette guideway 24 swings in direction G to the operating position coupler 110 meshes with coupler 114 and coupler 112 meshes with coupler 116. Also, responsive to this operational positioning of the guideway 24, the film 42 is automatically driven a predetermined distance so that all fogged film is transported past the format area.

At the time when the cassette is loaded into the receptacle and guideway 24, the film transport mechanism is stopped and a pressure plate 127 and pressure place carrier 128 are standing open. Also, pressure wheel 122 is moved away from capstan 120. Therefore, as carrier 24 swings in direction G, film 42 is inserted under the pressure plate 127 and betweeen the capstan 120 and pressure roller 122. The positions of these parts 127, 128 are controlled by a cam 130 shaped to hold these parts open while the film 42 is moving during the camera operations, so that the film will not be scratched. As soon as the cassette is in the record position, the pressure roller 122 causes the film to engage the capstan 120, and the motor 118 is energized for ten cycles to advance the fogged film past the format area. After these ten cycles the cam 130 is in a position such that the pressure plate carrier 128 is moved to the closed position and the spring 138 biased, floating pressure plate 127 holds the film 42 flat in the format area. Therefore, as each document image is photographed, the cam 130 rotates to open the pressure plate carrier 128, the capstan 120 then advances the film 42 and the pressure plate carrier 128 is returned to its original closed position. This sequence of events occurs after each document is photographed and is controlled by one revolution of the cam 130.

According to the invention, the V-notch coupler 114 is connected to a tachometer 124 which generates signals for indicating a jammed film, a low film supply, and film footage. More particularly, as transparent disc 140 rotates and each of the radial lines 142 interrupts a light beam, a pulse is generated. The mechanism for moving the film past the format area 152 is very dependable and may be relied upon for precision of movement. However, the angular rotation of the transparent disc 140 varies as a function of the diameter of a roll of film on a reel associated with coupler 110. If the reel is almost full, a very small angular rotation is required to pay out enough film to advance it by one format area. If the reel is almost empty, a very large angular rotation is required to pay out that amount of film. In a purely hypothetical example, perhaps five pulses may be generated when the reel is full and twenty-five pulses may be generated when the reel is nearly empty.

A first function derived from the tachometer is to detect jammed or completely exhausted film. If the film jams or if the end of the film is pulled off the reel, no pulses are detected while the film is moved past the format area. Hence, the camera is in need of attention, and a suitable light or other signal may be provided.

A second function derived from the tachometer is to monitor the remaining footage of unexposed film. For example, in the above, purely hypothetical example, twenty-five pulses may be generated by the tachometer 124 when only three feet of film remain on the reel. This is enough film to complete a production run for microfilming a batch of documents; therefore, a low film signal may be given.

A third function is to display a footage of remaining film indication. Since the number of pulses generated per film frame advance varies with the diameter of a roll of film on a reel, the electronic logic controller may consult a table under a heading listing that number of pulses. From the data derived from this look-up table, the controller may cause any suitable display device to display the footage of the film which is remaining to be exposed. The number of pulses read from disc 140 responsive to any given film advance may also vary with factors such as whether the disc stops immediately before or immediately after a pulse is read out, or how tightly the film is wound. Therefore, the electronic logic controller is adapted to always keep a running average of the pulses counted during each of the last six film advances.

More specifically, attached to, and turning with, the film supply side V-tooth coupler 114 is a transparent disc 140, with a plurality of marks 142 uniformly formed radially thereon. A light source and photodetector combination 144 generates a pulse each time that a mark 142 passes therebetween, to cut the light falling on the photodetector. If the film jams, no marks are generated when the toothed coupler 114 should be turning. As the supply reel becomes exhausted, it experiences a greater angular excursion for each film advance. Therefore, a greater number of pulses are generated by the photocell 144. When a predetermined number of such pulses are generated responsive to each film advance after an exposure, a suitable end of film signal is given as by lighting a light at 146 (FIG. 1), and by sounding an alarm for example. Also, the automatic filming sequence is terminated by a low film signal. If desired, the signal produced by this photodetector may be used to indicate to the user that a specified amount of film is left in the film cartridge, by comparing the number of pulses generated each full advance to a table of predetermined pulses.

If additional microfilm images are desired on this same reel, the operator may manually push buttons 77 and 125 to operate the camera, one frame at a time. Arrangements may be such that any suitable number of documents may be manually copied after a low film signal terminates the automatic feed. In one embodiment, the arrangement allowed 50 additional documents to be manually copied. If the film is actually exhaustd, there are no pulses out of detector 124 and the camera cannot be advanced or operated.

The automatic camera of FIG. 1 advances a length of film in a preloaded cassette with film advance carried out in succesive frame increments. The cassette is loaded into the camera and the film is automatically driven for a predetermined distance, preferably for ten frames. If the film jams, a jammed film signal is generated by detector 124 for signaling the camera to eject the cassette therefrom. When the operator desires to eject the cassette, the camera is automatically driven in an effort to advance the film for a predetermined distance, such as ten frames.

The format area 152, below the pressure plate 27, is also seen in detail, within a double dot-dashed line circle 154 (FIG. 4). More particularly, there is a simple, preferably rectangular format window 156, through which a projected image passes before it reaches the film. A pair of small supplemental "blip" windows 158, 160 are formd on opposite sides of the format area 156. (A "blip" is a mark recorded adjacent to each image frame on the microfilm in order to facilitate automatic searching for a preselected frame). A separate light source, in this case a light emitting diode 162, 164 is positioned beneath each of the blip windows 158, 160 so that its light will shine through a blip window 158, 160 and upon the film. Therefore, if either of the light sources is lit, a corresponding blip mark is printed on the microfilm, adjacent to the image of the document appearing in the format area 156.

During readout, these blip marks are counted to enable an automatic machine to find one specific frame during searching. Therefore, if an image is, say, the tenth image on a roll of microfilm, a counter may be set to 10. When the reader counts ten blip marks, it stops the film in the same position that windows 158, 160 have relative to the format window 156 so that the image projected during readout is in the format area of the microfilm reader.

A supplemental large blip mark may be printed on either side of the film by lighting either of the light sources 162, 164 during the time film is being transported, in order to divide the recorded images into batches or files. Therefore, if access is desired to, say, the third file recorded on a reel of microfilm. The automatic searcher counts three large blip marks on the film and then stops.

In one embodiment, the structure actually used to record a blip mark is a slit which is 60-thousandths of an inch wide. A light source is positioned beneath the slit. When the film is held flat in the format area and the camera shutter is opened, the light is lit thus forming the blip on the film. When the document being photocopied is the first in a batch of documents, the light is lit during the time period when the film is being tansported. The light is lit for a period long enough to expose 160-thousandths of an inch of film. Thus, a small blip mark is recorded next to all micro images, except for the first image in a batch. For that image, the blip mark is almost three times longer than the small blip mark.

Means are provided for searching in the same sequence or oder direction regardless of the sequence or order direction that was followed when the images were recorded on microfilm. In greater detail, sometimes documents are filed in one order, such as a chronological order, and other times documents are filed in an inverse order, such as inverse chronological order. Thus, it may be convenient to record microfilm images in either of two sequences or orders. However, it may also be desirable to always read out the images recorded on the microfilm in the same order (e.g., the oldest document or lowest filing number is always encountered first).

According to the invention, the documents are placed heading up on the tray 58 and the light source 162 is lit in the format area when files are copied in the desired readout order. If a stack of documents are filed inverse to the desired readout order, push button 166 (FIG. 1) is operated. The documents are then placed heading down on the tray 58, and the other light source 164 is lit in the format area. The images are then recorded on the film in the filed order, but the film is rewound for readout in an order which is reverse to the recorded order. This way, the documents are always filed on microfilm for readout in the same sequence or order, regardless of the order in which they were originally photographed.

Moreover, since the inversely filed documents are originally copied heading down with the blip mark positioned on the opposite side of the format area, the microfilm which is read out in reverse order has the same image and blip mark orientation that appears on the microfilm when the documents are copied in their desired filling order. This way, the automatic search equipment reading the microfilm is unaware of the differences, except that in one case the tops of the images are aligned.

Briefly, in resume, the format area 156 has at least two opposite sides 158, 160. The microfilm 42 is transported past format area 156 and one of the blip mark forming means 162, 164 is selected to place blip marks on either of the two opposite sides of the format area. This selection places a mark on the same relative side of the document image appearing in the format area during each exposure. The mark forming means 162 on one side of the forming area is selected when documents are photographed in a heading up orientation. The mark forming means 164 on the other side of the format area is selected when documents are inverted from the heading up orientation, when they are originally photographed. Since the blip mark always appears on the microfilm in the same relative position with respect to the heading up orientation of the microfilm image, the marks on the film may be automatically read.

Means are provided for operating the previously selected blip mark forming means 162, 164 to form large blips responsive to an exposure of preselected ones of the documents. Thus, the previously selectd mark forming means 162, 164 when used to form a large blip may be used to divide the photographic images on the microfilm into files or batches. The previously selected blip mark forming means is operated responsive to special header cards (FIG. 5) which are placed between selected ones of the plurality of documents on the stack feeder 58.

Figure 5:
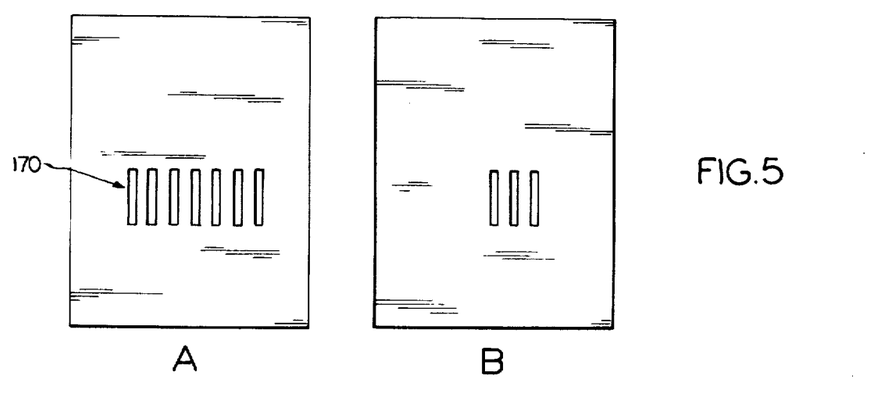
FIG. 5 are two plan views of header cards used to provide a human control interface with the automatic camera of FIG. 1, without simultaneously requiring constant human supervision.
Figure 6:
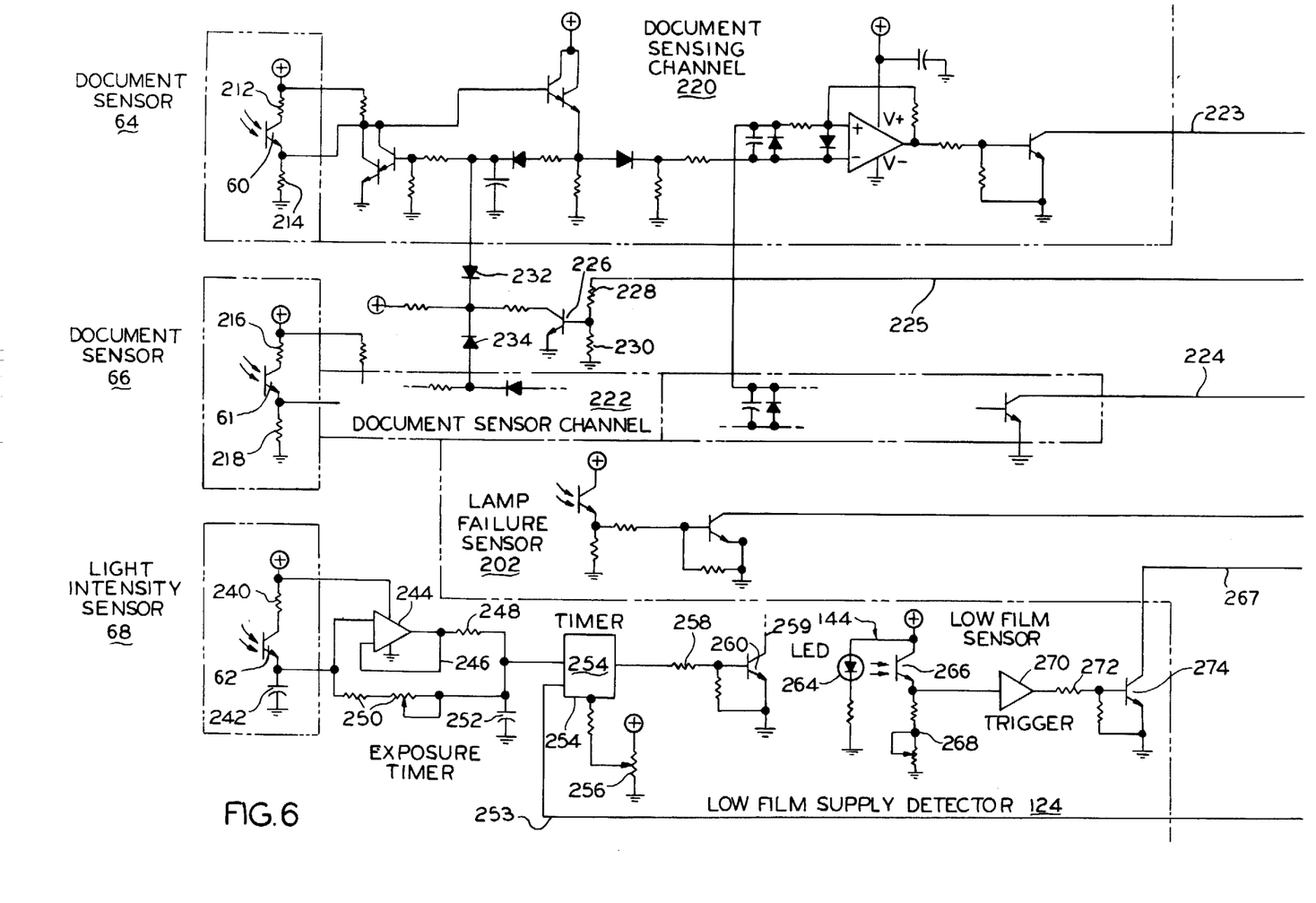
FIGS. 6 and 7 provide a schematic circuit diagram which should be joined as shown in FIG. 8 in order to provide a disclosure of the electronic controls for the microfilm camera.

In greater detail, the microfilm camera is controlled by a suitable electronic control circuit, such as an electronic logic controller, or the like 200 (FIG. 6). Therefore, it is desirable to have an interface between the operator and the control circuit. According to the invention, this interface is provided by a number of encoded header cards, an exemplary two of which are shown in FIG. 5.

Each header card contains a series of any suitable machine readable marks, such as light reflective tape, or slots or holes as shown at 170. These slots ae made long enough so that they may be read by photodetector 60 (FIG.1) regardless of how badly (within reason) they might be misaligned while they pass over the copy area 54. The photodetector 60 produces a train of pulses as the light falling on it is interrupted by the holes 170 in the header card. Also the width of and spacing between the slots 170 are such that the resulting pulse train produced by the photodetector 60 is not duplicated by other machine read code marks that are likely to be encountered by the microfilm camera control circuit. For example, many checks are printed on punched cards, which are normally read by computers. Thus, holes 170 must not simulate the holes in the punched cards which are likely to be photocopied by the camera of FIG. 1. Finally, the slots 170 are equally spaced so that the resulting pulses produced by the photodetector 60 have a known and predictable number of transitions.

The operator of the camera will have at her disposal a number of these header cards with different encoded marks on them. By way of example, FIG. 5A shows a header card with seven slots and FIG. 5B shows a header card with three slots. In addition, each header card also has operator readable language printd thereon. For example, the header card of FIG. 5A may have printed thereon "Double Side Copy Required". The header card of FIG. 5B may have "Batch Control" printed on it. Of course, any other suitable headings and any other suitable number of slots may also be provided. Thus, when the operator assembles a stack of documents for copying, she inserts a suitable header card whenever she considers it necessary or desirable to have the microfilm camera perform a specific function. For example, at the beginning of a stack of documents relating to a single file, the operator may place the batch control header card of FIG. 5B.

When its turn comes up, this header card (FIG. 5B) feeds through the machine and the photodetector 60 generates a train of six pulses that command a desired function. For example, the light source 162 or 164 (FIG. 4) may be lit to make a batch or file blip mark on the film, and the batch control number is incremented. This way a high speed search may be conducted by counting these batch or file blip marks. Then, a lower speed document by document search may be conducted by counting the small blip marks which accompany each document. Also, the electronic logic controller 200 is programmed so that the batch control header card may reset the document number displayed at 70, 71 to zero or allow it to continue displaying sequential numbers. Either mode of operation is operator controllable by push button 74.

If the header card of FIG. 5A is included in the stack of documents, the automatic feed is interrupted. The operator may turn over the last document that was copied and hand feed it into slot 94, and then the automatic feed resumes.

In a similar manner, any suitable number of header cards may be provided to command the camera to perform any suitable number of functions. Each header card is transported as all documents are transported through the machine. However, none of the header cards is actually copied by the camera.

Figures 7, 8:
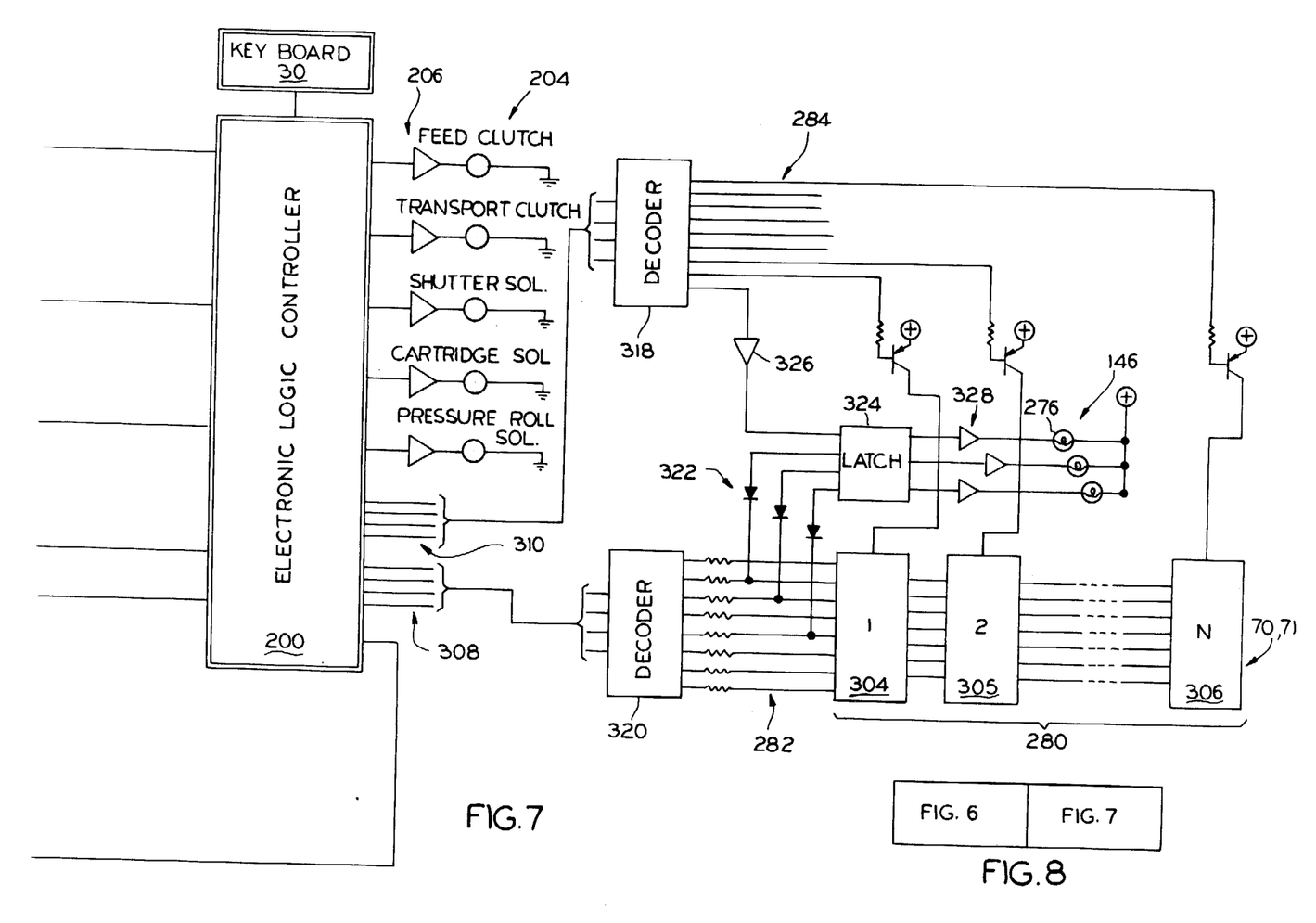

The microfilm camera described above is controlled by a suitable electronic control circuit, here the electronic logical controller 200 (FIGS. 6-8). As pointed out above, the term electronic logic controller is used in a broad manner to encompass not only the specific electronic devices, per se, but also all subsidiary or cooperating equipment that may be required to make a functional system, such as logic and control circuits, gates, signal channels and the like.

The inputs for this electronic logic controller are derived from document photodetectors 60, 61, light intensity sensor 62, the end of film detector or encoder 124, and a lmap failure sensor 202 included within the housing 20 and illuminated by light sources (not shown). The outputs of the electronic logic controller 200 are numerical displays 70, 71, lamp bank 146 and a number of clutches and solenoids 204, identified by legnds on the drawing. Sensors 60-62, numerical displays 70, 71 and lamp bank 146 are also shown in FIG. 1. Film end detector or encoder 124 is also seen in FIG. 4. Lamp failure sensor 202 indicates when the lamp which illuminates the documents is burned out. Each of the clutches or solenoids 204 is powered and driven via an associated driver amplifier 20, which is triggered and controlled from the electronic logic controller 200.

The document sensing channels 220, 222 signal the electronic logic controller 200 whenever a document interrupts the light falling on the associated photodetectors 60, 61. In greater detail, each of the document photodetectors 60, 61 comprises a light sensitive device biased via a pair of resistors 212, 214 and 216, 218, which are connected between battery and ground. Each of these photodetectors is coupled to drive an individually associated document sensing channel 220, 222, which is explained in detail in a copending application Ser. No. 644, 798, filed Dec. 29, 1975 now U.S. Pat. No. 4,027,154 by John R. Flint, entitled "Electronic Document Detector Circuitry with Feedback Control" and assigned to the assignee of this application. Therefore, they will not be described in detail at this point.

Accordingly, signals appear on conductor 223 which indicate whether a document is or is not then interrupting the light falling on device 60. Likewise, signals appear on conductor 224 to indicate the presence or absence of a document, according to whether light falls on at photodetector 61. This way the electronic logic controller 200 is constantly aware of whether a document is present and when it is properly located between the sensors in the copy area.

Each of these document sensing channels should be disabled or inhibited by the electronic logic controller 200 whenever the cover 56 of the microfilm camera is opened because the machine can then not use its transport system. Actually, the inhibition of the channel is accomplished in conjunction with signals which turn a main camera motor off or on. In greater detail, when the main motor is not allowed to run, electronic logic controller 200 returns a disabling signal via wire 225, which switches on a transistor 226. This may be the same signal which inhibits the motor. The base of transistor 226 is biased from a voltage divider comprising resistors 228, 230. When transistor 226 switches on, ground is applied through the diodes 232, 234 to inhibit the document sensing channels 220, 222. When the cover 56 is again closed, the main motor may again be driven. Therefore, the electronic logic controller 200 enables the main motor, and in doing so removes its inhibiting signal from wire 225 to switch off the transistor 226 and remove ground from the diodes 232, 234, thereby enabling the document sensing channels 220, 222 to again function as documents are transported by belts 63.

The light intensity sensor 68 includes a photosensitive device 62 with its bias applied via a resistor 240 and via resistor 250 and charging capacitor 252. The sensor 68 output is taken from the emitter of device 62 and applied to the positive input of a buffer amplifier 244, having units voltage gain via a negative feed back 246. The current limiting resistor 248 and a positive current feedback circuit 250 provide a bias and calibrate the current gain of the circuit.

A capacitor 252 is charged responsive to the primary current through resistor 248 and the secondary current through resistor 250; therefore, the rate of charging varies as a function of the intensity of the light falling on the photosensitive device 62. The rate of charge built upon the capacitor 252 varies the duty cycle of device 254. The threshold of response for the device 254 is adjusted at potentiometer 256.

According to the invention, the charge upon the capacitor 252 reaches a predetermined level set by potentiometer 256 after a variable period which depends upon the intensity of the light reflected from the document in the copy area 54, as detected by sensor 62. Charging capacitor 252 is discharged as a result of a short pulse applied over control line 253 by the electronic logic controller 200. This pulse on line 253 signals that the electronic logic circuit 200 has commanded the shutter to open. At that time, capacitor 252 starts to charge at a rate determined by the amount of light reflected from the document. The required amount of charge is set by potentiometer 256. When the charge requirements are met, a comparator signals the electronic logic circuit which closes the shutter.

The output of device 254 is passed through resistor 258 and transistor 260 to conductor 259 and the electronic logic circuit 200.

According to a further aspect of the invention, the electronic logic controller 200 gives a signal when the supply of film is low, indicates footage remaining, and signals jammed film conditions. In greater detail, as the supply of film nears exhaustion, the supply reel must turn further each time the film advances for another exposure because the circumference of film wound upon a nearly exhausted reel is much less than the circumference of the film wound upon a fresh reel, for example. Therefore, more of the radial marks upon the disc 140 (FIG. 4) interrupts the light of LED 264 falling upon the photosensitive device 266. Each light-interruption triggers the transmission of a pulse over wire 267 to the electronic logic controller 200. The bias of the film detector 124 is set by an adjustment of potentiometer 268.

The output of the photosensitive device 266 operates a trigger circuit 270, which may be a Schmitt trigger, for example, in order to produce a well-shaped pulse. The shaped pulse is applied through a resistor 272 and transistor 274 to conductor 267 and the electronic logic controller 200. The electronic logic controller 200 lights a lamp 276 in display 146 to indicate a low film supply. Alternatively, the electronic logic controller 200 may display a film footage scale read out on the front of the camera, or light a film jammed light. After a low film signal, the camera only responds to manual controls until the film is either reloaded or actually exhausted.

Means are provided for displaying a numerical read out (FIG. 7), which is a numerical display type conventionally used in hand held calculators. A plurality of display positions 280 are connected in parallel via wires 282 which are sequentially marked according to the desired numerical display. Another series of wires 284 are successively marked for enabling each of the display positions to cause the enabled position to display a number according to the marking then appearing on wires 282.

The capacity to make an unused numerical display, is used to control display lamps 146 for indicating camera status condition. In greater detail, the display device 280 includes any suitable number "N" of numerical display positions. For example, if there are seven such display positions, the position 304 displays a number in the hundred thousands position, while the position 306 displays a number in the units position. The electronic logic controller 200 responds to signals received from keyboard 30 to control the display 280 in a known manner.

If the display 280 is arranged to display, say seven digits, and if the electronic logic controller 200 and decoders 318, 320 are arranged to command a display of nine digits, for example, the control capacity for the two unequipped digits may be used to selectively light machine status display lamps. For example, as here shown, the electronic logic controller applied signals through OR gate diodes 322 to a latch circuit 324. At the time in the display sequence, when these signals may be effective, the decoder 318 signals through an amplifier 326 to enable latch 324 to operate. Responsive thereto, any suitable power source acts through amplifiers 328 to light lamps 146 which remain lit until the underlying problems are corrected. For example, the low film supply lamp goes out when a fresh film supply is loaded into the camera.

Those who are skilled in the art will readily perceive how changes and modifications may be made in the inventive structure. Therefore, the appended claims are to be construed broadly enough to cover all equivalent structures falling within the true scope and the spirit of the invention.

We claim:

1. An automatic microfilm camera comprising stack feeder means for receiving and automatically transporting a plurality of documents one at a time to be microphotographed by said camera, detector means for detecting the presence of each of said transported documents when located within a copy area of the camera, means responsive to said detector means for operating said camera to expose said microfilm and make thereon photographic images of the documents while they are in said copy area, a document transport means for feeding said documents to said copy area ad removing the same after microphotographing, means for interrupting the operation of said stack feeder to stop the automatic transport of said documents, means for feeding a single document through said document transport means during an interval while said stack feeder is interrupted, and means for thereafter restarting said stack feeder to resume the automatic transport of documents, continuing from the point of document transport that has been reached prior to said interrupting.

2. The camera of claim 1 wherein said interrupt means comprises a header card placed at a location in the stack of documents where an interrupt in the operation of said stack feeder is desired.

3. The camera of claim 1 and electronic logic controller or other electronic control means for controlling the operation of said camera and said stack feeder responsive to signals from said detector means.

4. The camera of claim 1 wherein the stack feeder means includes at least one transport belt for moving said documents to said copy area, and said means for feeding a single document comprises a slot for inserting a document on said document transport means at a point between said stack feeder and said copy area.

5. The camera of claim 4 wherein said transport belt is positioned a predetermined distance away from an edge of each of said plurality of documents whereby the length of said documents need only be substantially equal to said predetermined distance and may vary over said distance in a random manner.

6. The camera of claim 1 and means for displaying a number adjacent each of said documents when in said copy area, whereby the displayed number identifies the document in the document area at the time of the number display, an means for manually operating said number display means so that any preselected file number may be printed on said microfilm adjacent the photographic document image.

7. The camera of claim 6 and means responsive to the transport of said documents past said copy area for automatically advancing said number display in a preselected manner.

8. The camera of claim 1 and pin drive wheel means for transporting perforated continuous strip documents through said copy area, and means for selectively engaging or disengaging said pin drive wheel means, whereby said pin drive wheel is effectively positioned to engage documents only when said perforated continuous strip document is transported through said camera.

9. The camera of claim 1 and means for transporting said microfilm through said camera, said film transport means comprising a cassette containing preloaded film which travels in a path which emerges from and then reenters said cassette, and means associated with said camera and operated responsive to an insertion of said cassette into said camera for engaging said emerging film to drive it past a format area in said camera.

10. The camera of claim 9 wherein said film engaging means comprises means for slipping the film in said emerging path sideways into said camera.

11. The camera of claim 9 wherein said film engaging means comprises at least one V-notch coupler having a first half coupler in the cassette and a second half coupler in said camera, signaling means operated together with said second half coupler to signal when the coupler experiences greater than a predetermined angular displacement responsive to each exposure, and means responsive to said signaling means for giving a camera control signal.

12. The camera of claim 11 wherein said signal indicates a low film supply for stopping said automatic document transport, and means for manually overriding said low film signal to enable additional images to be photographed until said low film is exhausted, whereby a file may be completed on the same strip of film.

13. The camera of claim 1 wherein said camera includes a format area having at least two opposite sides, means for transporting said microfilm past said format area, and means on the opposite sides of said format area for placing a photographable mark on a selected one of said two sides of said format area responsive to each exposure of said camera, the mark forming means on one of said sides being selected if said documents are photographed in a first orientation and the mark forming means on the other of said sides being selected if said documents are in a second orientation when photographed, whereby said mark always appears on said film in the same relative position with respect to said first orientation of said document image on said film so that the marks on said film may be automatically read 14. The camera of claim 13 and means for operating the previously selected one of said mark forming mean responsive to an exposure of a preselected one of said documents thereby forming a unique mark which divides said images on said microfilm into files or batches.

15. The camera of claim 14 and means whereby the previously selected mark forming means is operated responsive to header cards which are selectively placed between certain ones of said plurality of documents on said stack feeder.

16. The camera of claim 1 and means for displaying a plural indicia readout comprising a plurality of display positions connected in parallel, means for sequentially marking said parallel positions according to a desired indicia display, means for successively enabling each of said display positions to cause the enabled position to display and indicia according to said marking, and means responsive to an enabling of an unused display position for indicating a machine status condition.

17. An automatic microfilm camera comprising means for automatically transporting any of a plurality of documents past a copy area, said documents having different physical characteristics, at least one of which is separate sheets of paper and another of which is a pin-driven continuous strip of paper, means for normally transporting non-pin wheel driven ones of said documents past said copy area, pin drive wheel means on said camera for driving said continuous strip of paper, and means for normally placing said pin drive wheel means in a retracted and non-operating position during passage of non-pin-driven documents through said transport means and for extending said pin drive wheel means from said retracted position into an extended operating position during passage of pin-driven documents through said document transport means whereby said pin wheels do not engage said non-pin-driven documents and drive said pin-driven documents.

18. An automatic machine for processing a web in a pre-loaded cassette, with processing carried out in successive web increments comprising means for loading a cassette into said machine, means responsive to said loading for automatically driving said machine to advance said web for a predetermined distance means for detecting a jammed web condition, means responsive to said detection of a jammed web condition for signaling said machine to eject said cassette therefrom, and means responsive to each ejection signal for automatically driving said machine to advance said web a second time for a predetermined distance.

19. The machine of claim 18 wherein said web is microfilm on a reel and said machine is a camera, said jammed web condition film signal means comprises means for generating signals responsive to rotation of said reel, and means responsive to a failure to the generation of said signals when said reel should rotate for stopping said camera.

20. The machine of claim 19 wherein said camera contains a guideway which is mounted to move between either of two positions, said cassette being insertable into or removable from said guideway when it is in one of said two positions, and means for ceasing said automatic advance of said film responsive to movement of said guideway to said one of said two positions.

21. A system for recording automatic search marks upon microfilm comprising a camera having a format area, a pair of mark forming means, a corresponding one of said mark forming means being located on each of two opposite sides of said format area, means for applying documents in either a first or second order to be copied by said camera, and means responsive to each exposure by said camera for selectively operating one of said mark forming means when said document are copied in said first order and for operating the other of said mark forming means when said documents are copied in said second order.

22. The system of claim 21 and means responsive to preselected ones of said exposures for selectively operating the one of the mark forming means to form a unique mark.

23. A process for controlling an automatic camera having an automatic control circuit, said process comprising the steps of (a) loading and automatically transporting a plurality of documents one-at-a-time to be microphotographed by said camera, (b) detecting the presence of each of said transported documents when located within a copy area of the camera, (c) operating said camera to expose said microfilm and make thereon photographic images of the documents while they are in said copy area, (d) interrupting the operation of said camera to stop the automatic transport of documents, (e) feeding a single document through said document transport during an interval of said interrupt, and (f) automatically resuming the automatic transport of documents, continuing from the point of document transport that had been reached prior to said interrupt.

24. The process of claim 23 whererin said automatic control circuit is an electronic logic controller controlled responsive to signals from a detector means tripped by said documents while in said copy area.

25. The process of claim 24 and the added steps of (c.1) displaying an indicia adjacent each of said documents when said document is in said copy area, whereby the displayed indicia identifies the document in the copy area at the time of the indicia display, and (c.2) operating said indicia display means so that any preselected file indicia may be printed on said microfilm adjacent to the photographic document image.

26. The process of claim 25 and (c.3) automatically advancing said indicia display in a preselected manner responsive to each exposure.

27. The process of claim 26 and the added steps of (g) signaling when there is a low film supply, (h) stopping said automatic document transport, and (i) overriding said low film signal to enable additional imges to be photographed until said low film is exhausted, whereby a file may be completed on the same strip of film.

28. The process of claim 23 wherein said camera includes a format area having at least two opposite sides, and said film is transported past said format area, and the added steps of:

(c.1) placing a photographable mark on a selected one of said two sides of said format area responsive to each exposure of said camera, and (c.2) forming said marks on one of said sides if said documents are photographe in a first order and the other of said sides if said documents are in a second order when photographed, whereby said mark always appears on said film in the same relative position with respect to the first order of said document images on said film.

29. The process of claim 28 and the added steps of:

(c.3) placing a unique mark on the previously selected one of said sides of said format area responsive to an exposure of a preselected one of said documents whereby a unique mark on said previously selected side divides said images on said microfilm into files or batches.

* * * * *